United States Patent
Malzbender et al.

(10) Patent No.: US 6,654,013 B1
(45) Date of Patent: Nov. 25, 2003

(54) APPARATUS FOR AND METHOD OF ENHANCING SHAPE PERCEPTION WITH PARAMETRIC TEXTURE MAPS

(75) Inventors: Thomas Malzbender, Palo Alto, CA (US); Daniel George Gelb, Los Altos, CA (US); Hans Juergen Wolters, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/527,872

(22) Filed: Mar. 17, 2000

(51) Int. Cl.[7] ................................................ G06T 15/60
(52) U.S. Cl. ...................................... 345/426; 345/584
(58) Field of Search ................................ 345/581, 582, 345/584, 586, 426

(56) References Cited

U.S. PATENT DOCUMENTS

| | | | | |
|---|---|---|---|---|
| 5,253,339 A | * | 10/1993 | Wells et al. | 345/426 |
| 5,673,374 A | * | 9/1997 | Sakaibara et al. | 345/582 |
| 5,739,820 A | * | 4/1998 | Lyon | 345/426 |
| 5,949,424 A | * | 9/1999 | Cabral et al. | 345/581 |
| 6,078,332 A | * | 6/2000 | Ohazama | 345/582 |
| 6,246,416 B1 | * | 6/2001 | Stam | 345/426 |
| 6,271,856 B1 | * | 8/2001 | Krishnamurthy | 345/581 |
| 6,342,885 B1 | * | 1/2002 | Knittel et al. | 345/424 |

OTHER PUBLICATIONS

James F. Blinn, "Light Refelction Functions For Simulation Of Clouds And Dusty Surfaces", Computer Graphics, vol. 16, No. 3, Jul. 1982.*

Stephen H. Westin, "Predicting Reflectance Functions from Complex Surfaces", Computer Graphics, 26, Jul. 2, 1992.*

Phong, "Fast Phong Shading", SIGGRAPH @ 1986—AMC 0–89791–2/86/008/0103.*

Gregory J. Ward, "Measuring and Modeling Anisotropic Reflection", Computer Graphics, 26, Jul. 2, 1992.*

H. Rushmeier et al., "Applying Shape from Lighting Variation to Bump Map Capture," Proc. Eurographics, vol. 97, pp. 35–47 (1997).

* cited by examiner

*Primary Examiner*—Matthew Luu

(57) ABSTRACT

A graphics system that enhances shape perception. The presently preferred embodiment of the system utilizes the mathematical machinery of parametric texture maps. In general, parametric texture maps allow the graphics system to render surface features of a 3D object in a manner that is direction dependent but without the time consuming and expensive calculations involved in the evaluation of lighting equations on a per pixel basis. A parametric texture map holds a set of parameters that define a surface structure in a manner in which the appearance of the surface structure varies in response to a direction vector. The direction vector may be any user-defined vector including a light source vector or a half-angle vector. The parameters are those of a predetermined equation, the evaluation of which does not involve vector calculations. The equation may take any form including a polynomial equation or a non-polynomial equation. The graphic system renders a polygon with the surface structure using the equation.

24 Claims, 5 Drawing Sheets

APPARATUS FOR AND METHOD OF ENHANCING SHAPE PERCEPTION WITH PARAMETRIC TEXTURE MAPS

BACKGROUND OF THE INVENTION

1. Field of the Invention

The present invention relates generally to the field of computer graphics and pertains more particularly to an apparatus for and a method of enhancing shape perception in a computer graphics system.

2. Discussion of the Prior Art

The perception of shape and surface detail is crucial for the interpretation of images in a wide variety of disciplines. Examples include such diverse fields as the study of ancient artifacts and remains, archeology, forensics, diagnostic medicine, industrial inspection, and manufacturing control. The field of image enhancement provides a variety of conventional methods that can assist in making surface detail more apparent. For example, the scanner signal for electronically scanned images can be passed through an electrical filter with a high-frequency bandpass characteristic. More typically, two-dimensional (2D) image operators are conventionally used for enhancing detail in images of samples. There are many such operators currently available. One common method is to perform a convolution of the image with a 2D function that provides enhancement of high frequency content relative to low-frequency content. This is one method of implementing a 2D high pass filter.

Another possibility for scanned images is the technique of unsharp masking. In this process, the image is effectively scanned by two overlapping apertures, one at normal resolution and the other at a lower resolution, producing normal and low-resolution images, respectively. A masked image is then formed electronically with a proportionality constant. Typically the constant is such that the ratio of normal to low-resolution components in the masked image is from 1.5:1 to 5:1. Subjectively, the apparent sharpness of the image is improved.

One form of edge enhancement called statistical differencing involves the generation of an image by dividing each pixel value by its measured statistical standard deviation. The standard deviation is computed over some neighborhood of the pixel coordinate. The mean value of the original image at the pixel coordinate is approximated by blurring or smoothing the original image by a smoothing operator of low-pass form. This mean value is divided by the standard deviation to result in the enhanced image value. The enhanced image will be increased in amplitude with respect to the original image at edge points that deviate from their neighbors and decrease in relative amplitude elsewhere. Unfortunately, noise components may also be accentuated by this technique.

One of ordinary skill in the art will be aware of any number of other conventional enhancement techniques. Contrast enhancement methods in particular, such as high pass filtering, unsharp masking, and statistical differencing can be somewhat useful for making surface detail more apparent. However, these operations are inherently 2D and are therefore limited. In contrast, the present invention draws upon three-dimensional (3D) information extracted from multiple 2D images simultaneously and therefore provides a fundamentally new and different capability.

A definite need exists for a system having an ability to use 3D information to enhance the perception of surface detail and shape. In particular, a need exists for a system which is capable of allowing the user to modify reflectance properties and lighting conditions in a skillful manner. Ideally, such a system would have a lower cost and a higher productivity than conventional systems. With a system of this type, system performance can be enhanced. A primary purpose of the present invention is to solve this need and provide further, related advantages.

SUMMARY OF THE INVENTION

A graphics system is disclosed that enhances shape perception. The presently preferred embodiment of the system utilizes the mathematical machinery of parametric texture maps. In general, parametric texture maps allow the graphics system to render surface features of a 3D object in a manner that is direction dependent but without the time consuming and expensive calculations involved in the evaluation of lighting equations on a per pixel basis. A parametric texture map holds a set of parameters that define a surface structure in a manner in which the appearance of the surface structure varies in response to a direction vector. The direction vector may be any user-defined vector including a light source vector or a half-angle vector. The parameters are those of a predetermined equation, the evaluation of which does not involve vector calculations. The equation may take any form including a polynomial equation or a non-polynomial equation. The graphic system renders a polygon with the surface structure using the equation.

BRIEF DESCRIPTION OF THE DRAWING

The above and other objects and advantages of the present invention will be more readily appreciated from the following detailed description when read in conjunction with the accompanying drawing, wherein.

DETAILED DESCRIPTION OF THE PREFERRED EMBODIMENTS

The reflectance properties of a surface can be characterized by its Bidirectional Reflectance Distribution Function (BRDF) which characterizes the color of a surface as a function of incident light and exitant view directions.

$$BRDF(\theta_i, \Phi_i, \theta_e, \Phi_e, \lambda) \tag{1}$$

The BRDF is the ratio of the reflected intensity in the exitant direction e to the incident energy per unit area along the incident direction i. It does contain a dependence on wavelength $\lambda$ but in practice this is often approximated by independent functions per color channel. Neglecting its dependence on wavelength and polarization, the BRDF is a four-dimensional (4D) description of the dependence of light transfer on the incident direction of a light ray and the exitant direction of a viewing ray. For diffuse objects there is no view dependence and the BRDF reduces to a 2D description for the light source direction. The present invention utilizes this reduced reflectance function.

With some exceptions, the reflectance properties of a material are conventionally modeled as being constant across a patch of the surface of an object. However, the spatial variation of reflectance properties across surfaces of real objects is often more complex than what can be captured with texture maps. This complexity is usually handled by a manual process or by segmenting the image into regions of similar properties. The present invention involves a photographic method of sampling and modeling the reflectance function independently for each pixel in an image of an object or scene. This model will then allow one to change the material properties of the objects in the scene, thereby enhancing shape cues provided by shading to make shape more apparent to the visual system.

Figure 1:
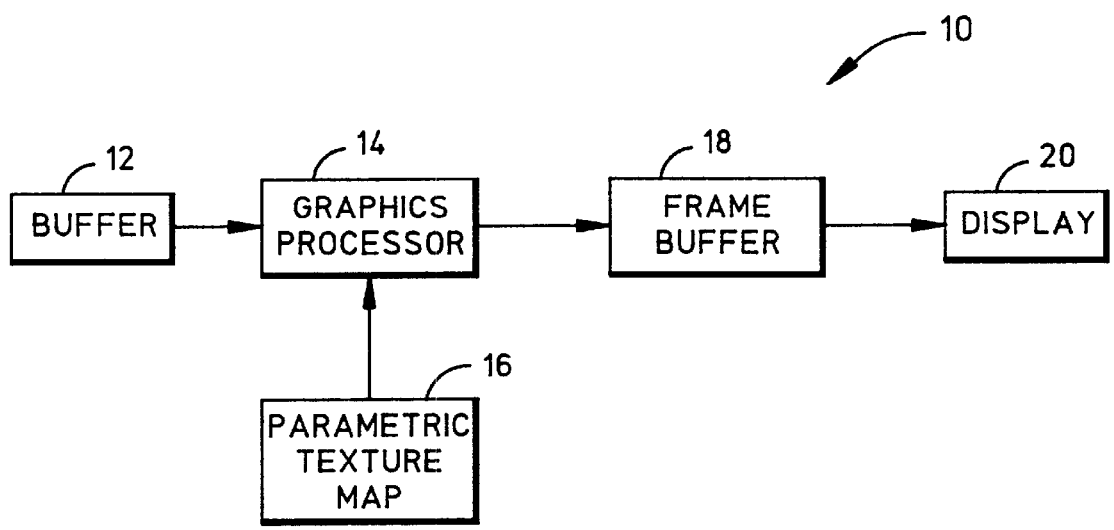
FIG. 1 is a block diagram of a computer graphics system according to a preferred embodiment of the present invention.

The preferred embodiment of the present invention utilizes parametric texture maps. However, the disclosed enhancement methods are not limited to parametric texture maps and can be implemented with other mathematical representations of reflectance functions. A description of the preferred embodiment will therefore begin with an overview of parametric texture maps. Turning first to FIG. 1, a block diagram of a computer graphics system 10 according to a preferred embodiment of the present invention is shown. The computer graphics system 10 includes a buffer 12, a graphics processor 14, a parametric texture map 16, a frame buffer 18, and a display 20. The buffer 12 holds geometry data that describes a 3D object which is to be generated on the display 20. The 3D object is represented in the buffer 12 as a set of polygons in a 3D space. In one embodiment, the polygons are triangles and the geometry data in the buffer 12 includes the 3D coordinates of the vertices of the triangles.

The graphics processor 14 reads the parameters that define the polygons from the buffer 12 and scan converts each polygon. The scan conversion of a polygon yields a 2D view of the polygon which depends on a view direction and a light source direction. A 2D view of a polygon includes a color value for each pixel of the polygon which is visible in the plane of the display 20. The graphics processor 14 writes the color values for the rendered polygons into the 20 frame buffer 18. The color values from the frame buffer 18 are provided to the display 20 on a frame by frame basis. The display 20 can be any conventional 2D display device such as a raster scan device or flat-panel display device.

The parametric texture map 16 holds parameters that define a surface structure in a manner in which the appearance of the surface structure varies with any user-defined vector such as the view vector, the light source vector, or the half-angle vector. The half-angle vector is a vector that is halfway between the view and light vectors. The graphics processor 14 maps the surface structure defined in the parametric texture map 16 onto the polygons obtained from the buffer 12 during scan conversion. The result is a more realistic rendering of 3D features in a surface on a 3D object in comparison to texture mapping but without the computational penalties associated with bump mapping.

In one embodiment, the parameters contained in the parametric texture map 16 are the A1, A2, A3, A4, A5, and A6 coefficients for evaluating the following second order polynomial equation:

$$C_i = A1 D_u^2 + A2 D_v^2 + A3 D_u D_v + A4 D_u + A5 D_v + A6 \quad (2)$$

where $D_u$ and $D_v$ are the 2D components of the user-defined vector. For example, if the parametric texture map 16 is adapted to the view direction then $D_u$ and $D_v$ are the 2D components of an eye point vector. Likewise, the terms $D_u$ and $D_v$ are the 2D components of a half-angle vector if the parametric texture map 16 is adapted to the half-angle vector.

TABLE 1 illustrates the general contents of the parametric texture map 16. The parametric texture map 16 contains n by m entries. Each of the n by m entries corresponds to a sample of a particular surface modeled by the parametric texture map 16. These samples may be referred to as texels which is an abbreviation for texture elements. The coefficients for an individual texel are denoted as $A1_{ij}$ to $A6_{ij}$ it wherein i ranges from one to n and j ranges from one to m.

TABLE 1

| $A1_{1,1}$ | $A2_{1,1}$ | $A1_{1,2}$ | $A2_{1,2}$ | ... | $A1_{1,m}$ | $A2_{1,m}$ |
| $A3_{1,1}$ | $A4_{1,1}$ | $A3_{1,2}$ | $A4_{1,2}$ | | $A3_{1,m}$ | $A4_{1,m}$ |
| $A5_{1,1}$ | $A6_{1,1}$ | $A5_{1,2}$ | $A6_{1,2}$ | | $A5_{1,m}$ | $A6_{1,m}$ |
| $A1_{2,1}$ | $A2_{2,1}$ | $A1_{2,2}$ | $A2_{2,2}$ | ... | $A1_{2,m}$ | $A2_{2,m}$ |
| $A3_{2,1}$ | $A4_{2,1}$ | $A3_{2,2}$ | $A4_{2,2}$ | | $A3_{2,m}$ | $A4_{2,m}$ |
| $A5_{2,1}$ | $A6_{2,1}$ | $A5_{2,2}$ | $A6_{2,2}$ | | $A5_{2,m}$ | $A6_{2,m}$ |
| . | . | . | . | | . | . |
| . | . | . | . | | . | . |
| . | . | . | . | | . | . |
| $A1_{n,1}$ | $A2_{n,1}$ | $A1_{n,2}$ | $A2_{n,2}$ | ... | $A1_{n,m}$ | $A2_{n,m}$ |
| $A3_{n,1}$ | $A4_{n,1}$ | $A3_{n,2}$ | $A4_{n,2}$ | | $A3_{n,m}$ | $A4_{n,m}$ |
| $A5_{n,1}$ | $A6_{n,1}$ | $A5_{n,2}$ | $A6_{n,2}$ | | $A5_{n,m}$ | $A6_{n,m}$ |

The parametric texture map 16 is representative of a set of parametric texture maps that may be used for rendering 3D objects in the graphics system 10. Each parametric texture map according to the present technique is adapted to a particular surface structure that is to be mapped onto a 3D object. In addition, each parametric texture map is adapted to provide realistic 3D rendering in response to the user-defined vector. For example, the parametric texture map 16 may be adapted to provide realistic 3D rendering in response to a varying light source direction for a given fixed view direction. Alternatively, the parametric texture map 16 may be adapted to provide realistic 3D rendering in response to a varying view direction for a given fixed light source direction.

In one embodiment, a parametric texture map may be adapted to a particular color channel of the display 20. For example, the graphic system 10 may include a separate parametric texture map for each of the red, green, and blue channels for an RGB display for a particular surface structure. One drawback to this approach is that three parametric texture maps are required. Alternatively, a single parametric texture map may be multiplied with each channel in a complete RGB texture map. In this embodiment, the parametric texture map encodes the brightness changes as a result of changes in the light vector, for example, and modulates the RGB color values in a corresponding texture map to yield the resultant color values. It is also possible to render objects illuminated by multiple light sources using this type of parametric texture map. Since the RGB color values are separate from the intensity, the intensity values can be calculated for different light sources and combined to get a final intensity value. The per-pixel intensity values are then multiplied with the RGB values to get the output color. A wide range of useful operations can be achieved by using different blending modes to combine parametric texture map evaluation results with calculated lighting, texture maps, or other sources during texture blending in the graphics pipeline.

Figure 2:
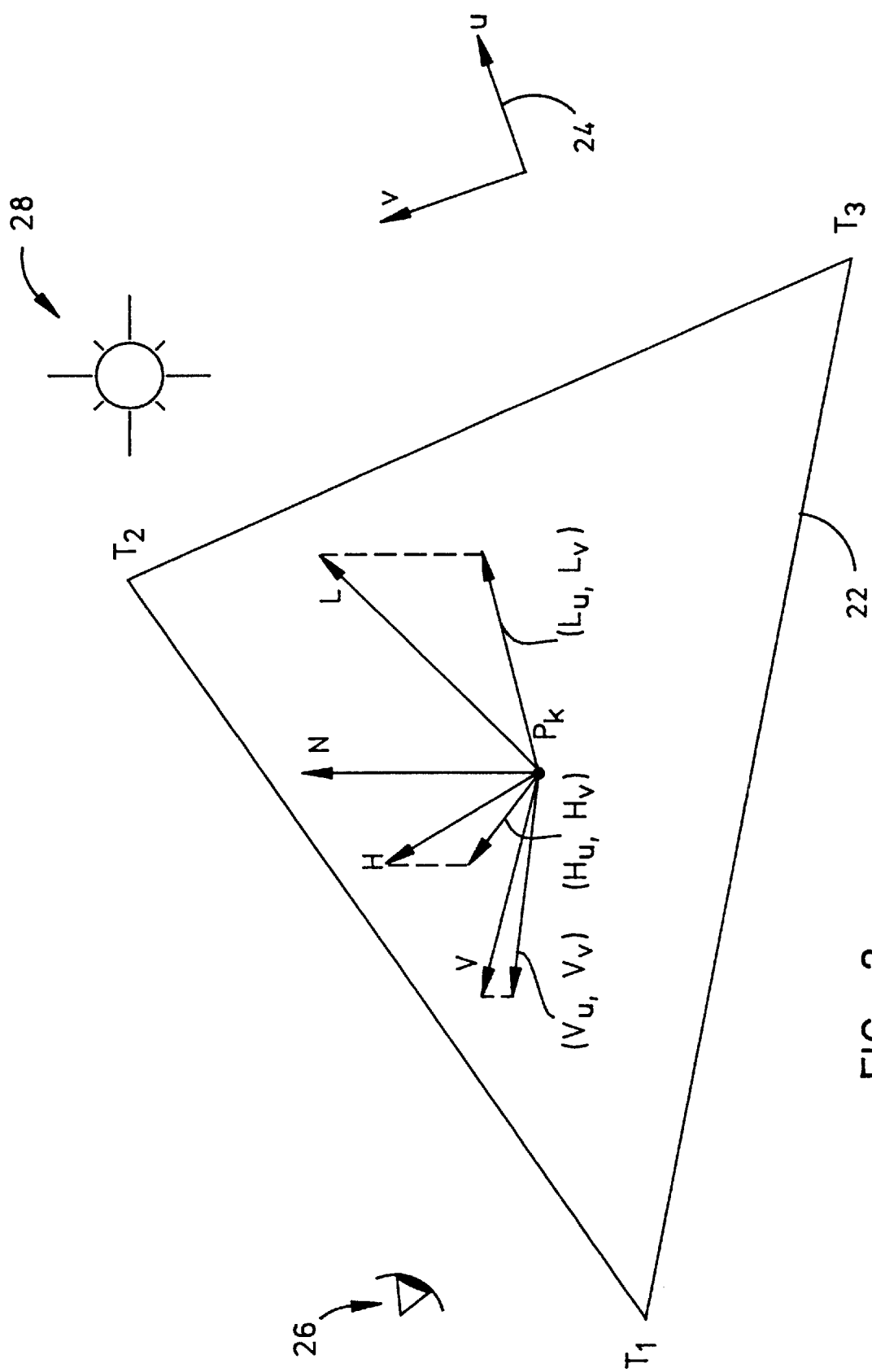
FIG. 2 is a graphical representation of a polygon which is defined in the buffer of FIG. 1 and which is to be rendered by the graphics processor of FIG. 1 using surface features defined by the parametric texture map of FIG. 1.

Turning now to FIG. 2, a graphical representation of a polygon 22 which is defined in the buffer 12 of FIG. 1 and which is to be rendered by the graphics processor 14 of FIG. 1 using surface features defined by the parametric texture map 16 of FIG. 1 is shown. The polygon 22 is defined by a set of three vertices ($T_1$, $T_2$, and $T_3$) in a 3D space. The local coordinate space is represented by a set of u and v axes 24 which are usually defined by the spatial texture coordinates of the polygon 22.

A surface normal vector N for the polygon 22 is shown, along with an eye point vector V, a light source vector L, and a half-angle vector H. Note that normal vectors are usually defined for the vertices rather than the entire polygon to improve realism. Here a single normal for the polygon is illustrated for simplicity. The eye point vector V represents a view direction from a pixel $P_k$ of the polygon 22 to an eye point 26. The light source vector L represents a light source direction from the pixel $P_k$ to a light source 28. The half-angle vector H represents the vector that is halfway between the eye point vector V and the light source vector L. Also shown is a ($V_u$, $V_v$) vector which is the eye point vector V projected down into the plane of the polygon 22. Likewise, a ($L_u$, $L_v$) vector is the projection of the light source vector L and a ($H_u$, $H_v$) vector is the projection of the half-angle vector H.

Figure 3:
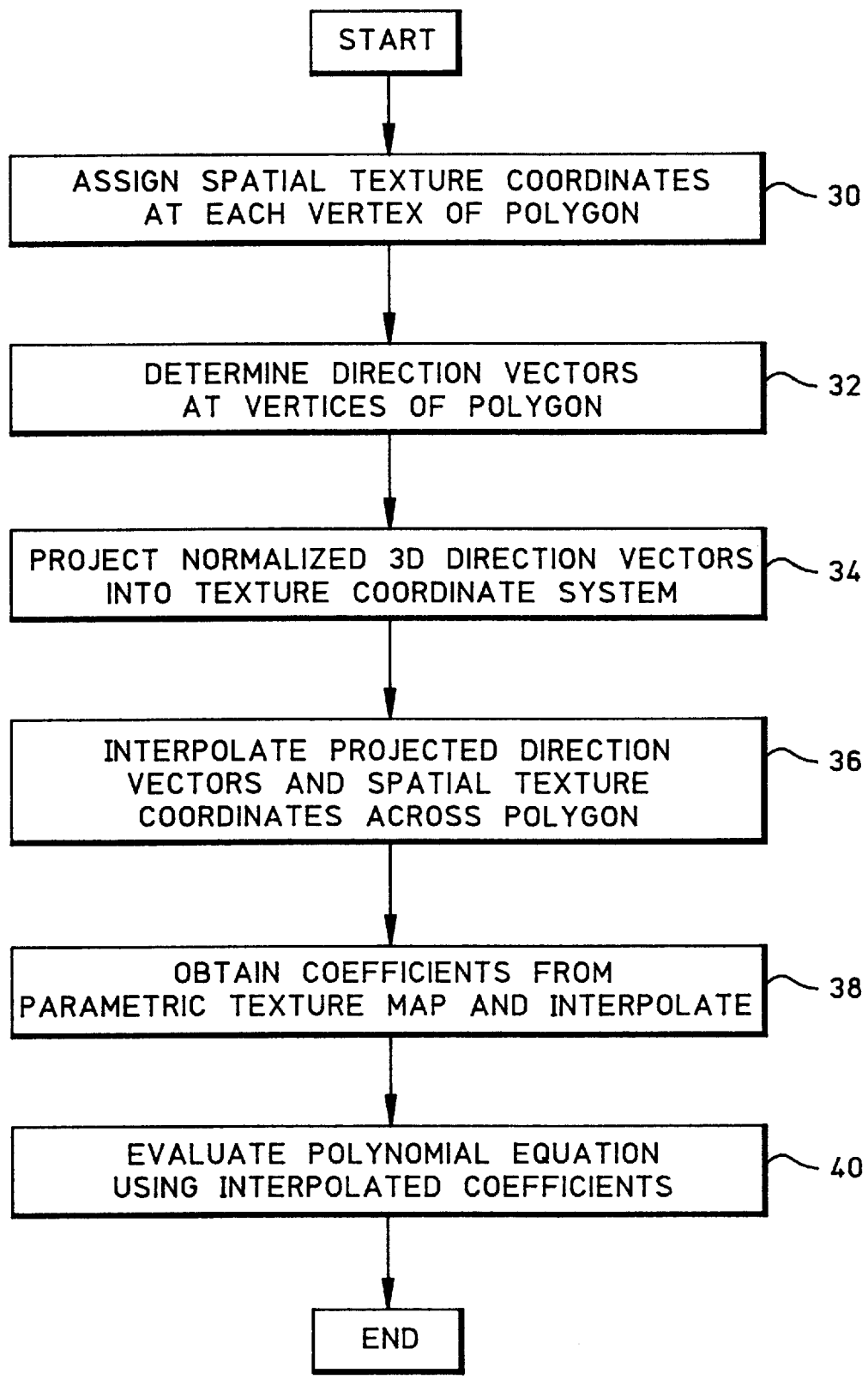
FIG. 3 is a flow diagram of a method according to the present invention for rendering a polygon using surface features defined by a parametric texture map.

FIG. 3 shows a flow diagram of a method according to the present invention for rendering a polygon using surface features defined by a parametric texture map. The steps shown are used to generate a color value for each of a set of pixels in the polygon 22 of FIG. 2. The following description for purposes of illustration focuses on the pixel $P_k$ of FIG. 2 as an example. The coefficients $A1_{ij}$ to $A6_{ij}$ in the parametric texture map 16 of FIG. 1 are adapted to yield color values in response to a user-defined vector such as a light source vector or an half-angle vector. This adaptation is done by using linear regression from a set of images that provide color values at each pixel for varying light directions. The following description for purposes of illustration focuses on an example in which the coefficients $A1_{ij}$ to $A6_{ij}$ are adapted to yield color values in response to a light source vector for a fixed eye point vector. Nevertheless, these techniques are readily applicable to a parametric texture map which contains coefficients that are adapted to yield color values in response to any user-defined vector. In addition, the coefficients $A1_{ij}$ to $A6_{ij}$ in the parametric texture map 16 yield color values for a particular color channel of the display 20 of FIG. 1. Additional parametric texture maps may be used to yield color values for the remaining channels. The steps are repeated with each polygon in the set of polygons representing the 3D object that is stored in the buffer 12 of FIG. 1. The process begins at START.

At step 30, the graphics processor 14 of FIG. 1 assigns spatial texture coordinates u and v of the parametric texture map 16 at each vertex $T_1$, $T_2$, and $T_3$ of the polygon 22. The spatial texture coordinates for the vertices $T_1$, $T_2$, and $T_3$ are denoted as $u_{T1}$, $v_{T1}$, $u_{T2}$, $v_{T2}$, and $u_{T3}$, $v_{T3}$, respectively.

At step 32, the graphics processor 14 determines direction vectors at the vertices of the polygon 22. The direction vectors in this example are light source vectors at the vertices of the polygon 22. The light source vector at the vertex $T_1$ is a normalized 3D vector that points from $T_1$ to the 3D coordinates of the light source 28 of FIG. 2. Similarly, the light source vector at the vertices $T_2$ and $T_3$ are normalized 3D vectors that point from $T_2$ and $T_3$, respectively, to the 3D coordinates of the light source 28.

At step 34, the graphics processor 14 projects the normalized 3D direction vectors determined at step 32 into the texture coordinate system u and v of the parametric texture map 16. This yields 2D parameterization or 2D components of each normalized 3D direction vector in the texture coordinate system of the parametric texture map 16. A 2D parameterization of a normalized 3D direction vector is denoted as $D_u$, $D_v$.

At step 36, the graphics processor 14 interpolates the projected direction vectors $D_u$, $D_v$ determined at step 34 and spatial texture coordinates $u_{T1}$, $v_{T1}$, $u_{T2}$, $v_{T2}$, and $u_{T3}$, $v_{T3}$ determined at step 30 across the polygon 22. This associates each pixel of the polygon 22 with $D_u$, $D_v$ parameters and with u and v texel coordinates in the coordinate space of the parametric texture map 16. The interpolation of step 36 may be performed using a variety of known techniques.

At step 38, the graphics processor 14 obtains the polynomial coefficients $A1_{ij}$ to $A6_{ij}$ from the parametric texture map 16 and interpolates them. It is important to note that there are several options for evaluating and interpolating the texture map. Interpolated texture coordinates will not yield exact texels in the input texture map so texture interpolation is needed. These interpolation methods are well known and include nearest-neighbor, bilinear, trilinear, and anisotropic interpolation. One option is to evaluate the polynomial at each of the sample points and then to interpolate the output value. Another option is to interpolate the polynomial coefficients to generate an interpolated polynomial and then to evaluate the polynomial. FIG. 3 illustrates the second option.

At step 40, the graphics processor 14 evaluates Equation (2) using the interpolated $D_u$ and $D_v$ terms from step 36 and the interpolated coefficients $A1_{ij}$ to $A6_{ij}$ from step 38 on a per pixel basis. For pixel $P_k$, Equation (2) yields a texel value $C_i$ which may then be used as a color value, luminance value, or other pixel or texture data.

It is generally the case that parametric texture mapping effects should only be applied to polygons that are front facing relative to the user-defined vector being used. In order to identify front facing and back facing polygons, a third variable is used. This third parameter D is typically the result of projecting the user-defined vector onto the vertex normal vectors. For front facing polygons, D will be positive and for back facing polygons, D will be negative. Fundamentally, D is the dot product between the vertex normal vector and the user-defined vector. It may or may not be desirable to have the parametric texture mapping effects stop abruptly at the transition from front facing to back facing. If desirable, the user can attenuate the effects to give a sharp or gradual cutoff as needed, possibly including evaluation for triangles that are back facing with respect to the user-defined vector.

The present techniques model the 3D effects of surface features by modeling the contribution of those features to surface colors directly. The contributions are then represented by the coefficients of Equation (2). The present techniques yield a mapping of surface features to a polygon that is direction dependent and that provides a quality of realism which is comparable to that yielded by the evaluation of lighting equations on a per pixel basis. Yet the evaluation of Equation (2), a second order polynomial, is relatively easy to perform in hardware, software, or both in comparison to the evaluation of lighting equations on a per pixel basis. The evaluation of Equation (2) involves integer multiply and add operations whereas the evaluation of lighting equations involves floating-point, square-root and divide operations. Although Equation (2) has been chosen to be a bi-quadratic polynomial, bi-cubic and higher order polynomials could also be used. Even non-polynomial functions could be supported by the present techniques. However, more complex functions are not currently preferred due to their higher implementation costs which are currently considered excessive.

Figure 4A:
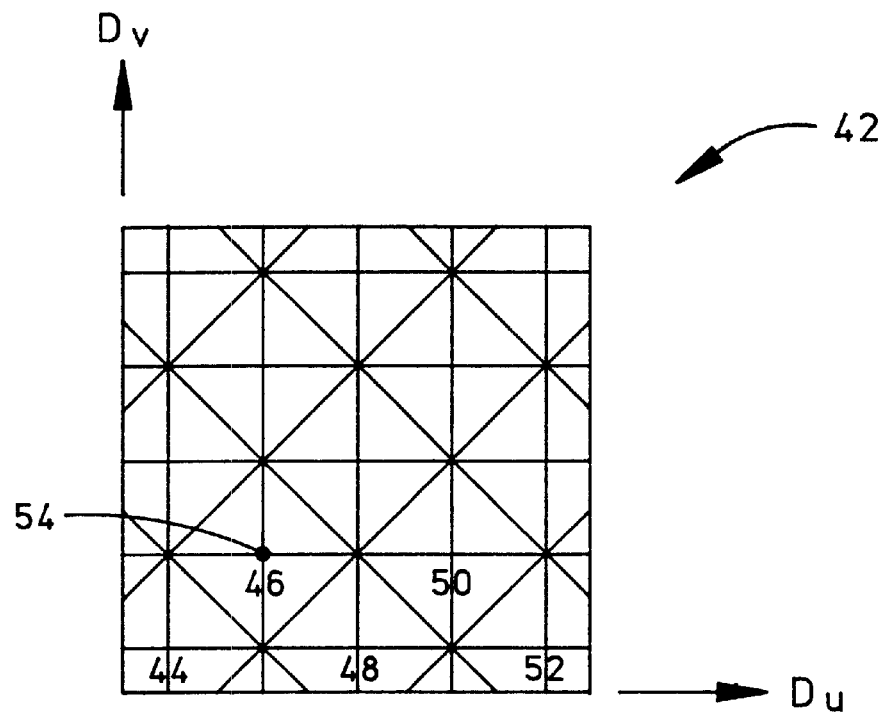
FIGS. 4A–4C illustrate an arrangement for determining the coefficients in a parametric texture map for an example surface structure employed in the present invention.
Figure 4B:
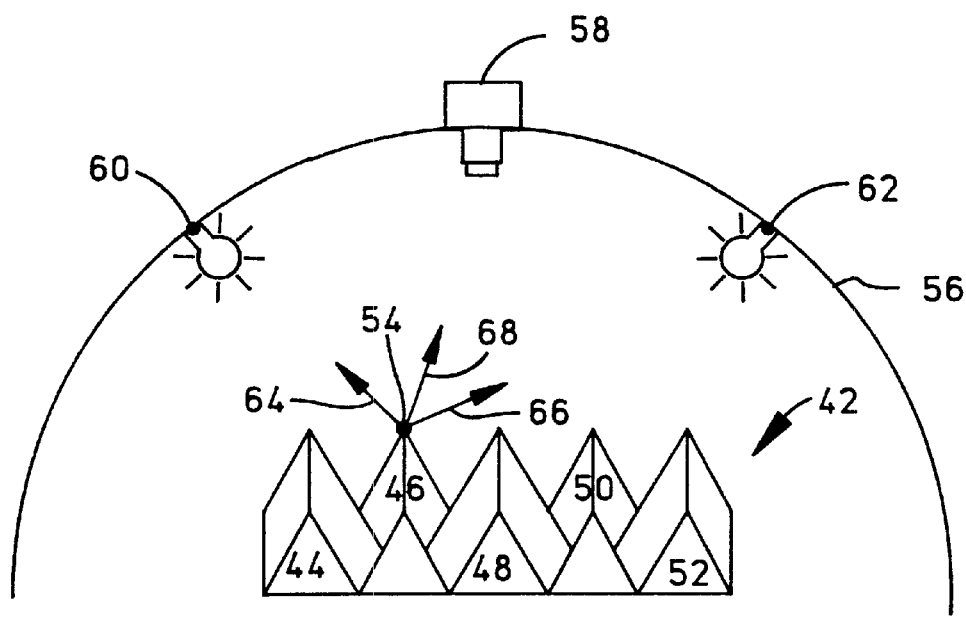
Figure 4C:
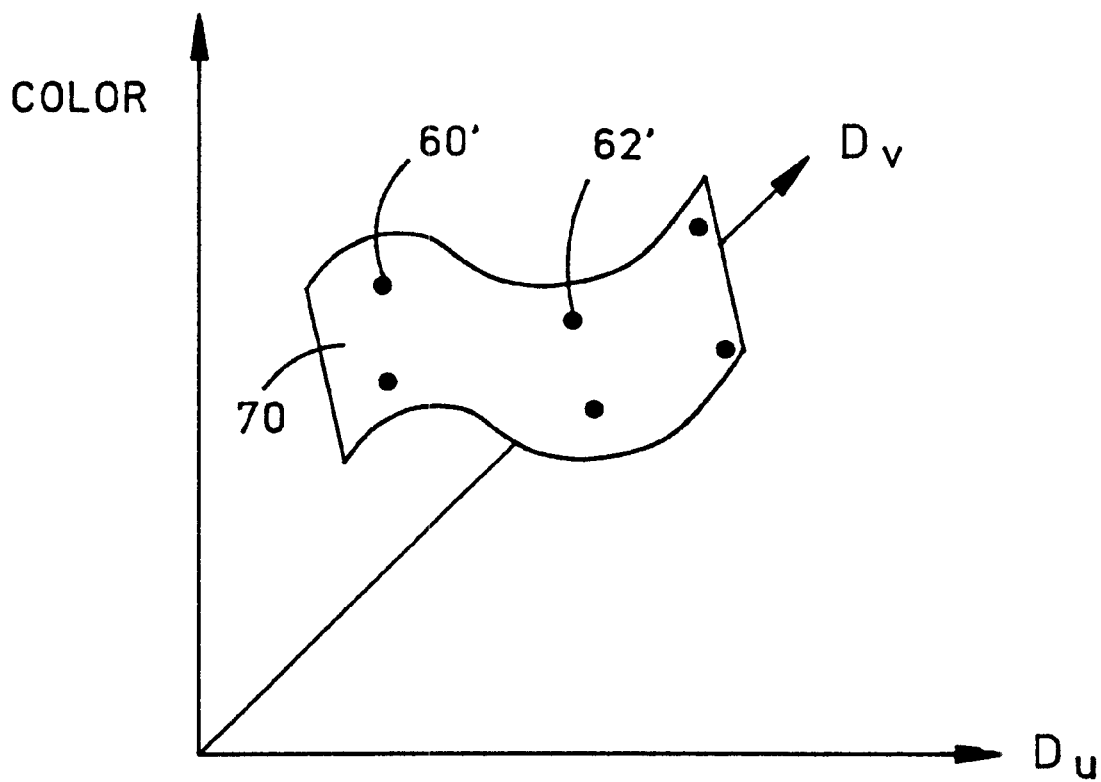

Turning now to FIGS. 4A–4C, an arrangement for determining the coefficients $A1_{ij}$ to $A6_{ij}$ of the parametric texture map 16 of FIG. 1 for an example surface structure 42 is illustrated. FIG. 4A shows a top view of the surface structure 42. The surface structure 42 is shown aligned to a pair of axes $D_u$ and $D_v$. The surface structure comprises an array of square right pyramid structures 44–52. A sub area 54 represents one of the texels of the surface structure. The surface structure is just one example of a surface structure and any imaginable surface structure may be modeled using the present techniques.

FIG. 4B shows a side view of the surface structure 42 of FIG. 4A along with a hemispherical dome 56 which is used to position a camera 58 and a light source. In this case, a single light source is shown positioned at two example positions 60 and 62 on the dome. A vector 64 represents a light source vector for the position 60 and a vector 66 represents a light source vector for the position 62.

The camera 58 is fixed in its position on the dome 56 when obtaining coefficients for a parametric texture map 16 that is adapted to yield color values in response to the light source vector. A vector 68 represents the eye point vector for the fixed position of the camera. The camera is used to obtain an image of the surface structure 42 for each of a set of predetermined positions of the light source on the dome 56. Each predetermined position of the light source represents a different light source vector and the corresponding image obtained with the camera yields a color value for each texel of the surface structure 42. For example, images obtained from n different positions of the light source yields n color values for each texel with each color value corresponding to a different light source vector for the eye point vector 68.

FIG. 4C shows a graph of the color values for the texel 54 obtained with the camera 58 for six different positions of the light source on the dome 56. These color values include a color value 60' which was obtained with the light source at position 60 and a color value 62' which was obtained with the light source at position 62. The color values are plotted against the axes $D_u$ and $D_v$. The coefficients $A1_{ij}$ to $A6_{ij}$ for the texel 54 for the eye point vector 68 are obtained by fitting the polynomial of Equation (2) to the color values obtained for the texel 54 using known techniques. A surface 70 is shown that represents a fit between the polynomial of Equation (2) and the six color values obtained by the camera 58 for the texel 54. The fit of the surface 70 to the n color values obtained by the camera 58 may be accomplished using standard least mean square methods to yield the polynomial coefficients.

This technique may readily be modified to obtain coefficients for a parametric texture map 16 that is adapted to yield color values in response to any user-defined vector. For example, the light source may be fixed at position 60 which corresponds to the light source vector 64. Then the camera 58, representing the eye point vector, is moved to n different positions on the dome 56. A surface fit to the obtained color values is performed in a manner similar to that described above. This concludes the overview of parametric texture maps.

A further modification of this technique is to utilize a parametric texture map 16 to provide enhanced rendering of the objects. Three methods are presented to enhance shape perception of objects by enhancing shading cues. This allows physical samples such as ancient artifacts and fossils to be photographed with a conventional digital camera and then to be redisplayed with a new set of material properties more conducive to the interpretation of surface shape. This helps to reduce the need to handle the objects repeatedly thereby risking damage to them. It also provides a superior perception of the object by comparison to a single photograph or even a set of photographs of the object. The object is used in place of the surface structure 42 of FIG. 4A above.

In general, the technique models the reflectance function independently for each pixel in an image of the object. This model then allows one to change the material properties of the object to enhance shape cues provided by shading to make the shape more apparent to the visual system. More specifically, three techniques that exaggerate the reflectance function in various manners will be outlined. These three enhancement methods may be adaptable to any of the variety of studies outlined above where subtle distinctions in depth are required for interpretation.

The key to the first two of the three the methods is to extract the surface normal from the captured images. For diffuse surfaces in the original source images captured above, the light direction that maximizes luminance provides an estimate of the surface normal for every pixel in the image. For the case of interest having negative curvature in each axis, this is found at projected light direction:

$$L_{u0} = \frac{A3A5 - 2A2A4}{4A1A2 - A3^2} \quad (3)$$

$$L_{v0} = \frac{A3A4 - 2A1A5}{4A1A2 - A3^2} \quad (4)$$

by solving Equation (2) for $\partial C/\partial u = \partial C/\partial v = 0$ at each pixel. The parameterization of the light direction is convenient since $L_{u0}$, $L_{v0}$ are two components of the estimated surface normal. The full estimated normal vector is simply:

$$N = (L_{u0}, L_{v0}, \sqrt{1-L_{u0}^2-L_{v0}^2}). \quad (5)$$

Photometric stereo methods from computer vision would provide an alternate approach to this stage of surface normal recovery and would also be affected by the presence of self-shadowing. We now turn to the three methods that have been implemented to exaggerate the reflectance function based on the extracted surface normal.

First is a technique that will be called specular enhancement. This technique begins with the realization that for every pixel of an image of the object, the normal vector can be used in a lighting equation to add either diffuse or specular shading effects to the image. Simulation of specularity is particularly effective at enhancing the perception of shape. To achieve specular effects, this technique uses the half-angle vector H and the estimated normal vector N of Equation (5) to compute a color contribution to the original image using the following equation $$I = Ck_s(H \cdot N)^n \quad (6)$$

where $k_s$ is the specularity and n is the specular exponent. Based on this, exaggeration of the reflectance function is achieved by changing one or more of the specularity $k_s$, the specular exponent n, or the simulated light source position and color C under interactive control. The lighting model in Equation (6) is known as the Blinn/Phong model. Any other lighting model such as that of Torrence/Sparrow can also be used at this stage to introduce specular effects. Equation (6) is preferred due to its simplicity.

A second technique is called diffuse gain. This technique initially realizes that for diffuse objects, the original photographed surfaces typically exhibit a gently varying change in surface intensity across the light direction. This change is modeled with a 2D convex parabola, namely Equation (2). The gaussian curvature of this parabola can be increased arbitrarily by a gain factor g by computing new coefficients for Equation (2) by using the following set of transformation equations:

$$A1'=gA1$$

$$A2'=gA2$$

$$A3'=gA3$$

$$A4'=(1-g)(2A1L_{u0}+A3L_{v0})+A4$$

$$A5'=(1-g)(2A2L_{v0}+A3L_{u0})+A5$$

$$A6'=(1-g)(A1L_{u0}^2+A2L_{v0}^2+A3L_{u0}^2L_{v0})+(A4-B4)L_{u0}+(A5-B5)L_{v0}+A6. \quad (7)$$

This transformation maintains the luminance maximum at the same location, namely ($L_{u0}$, $L_{v0}$), thereby retaining the surface normal direction. It also maintains the luminance at ($L_{u0}$, $L_{v0}$) retaining the surface albedo and color in this direction. However, the directional sensitivity of the surface to light is increased by this transformation thereby enhancing light reflectance properties of the object.

Third is a technique that will be called light direction extrapolation. This technique begins with the realization that the light source direction is a normalized quantity encoded by the ($L_u$, $L_v$) vector, that is, the projection of the light source vector L. Further, ($L_u$, $L_v$) for physically realizable light sources is limited to being within the unit disc since the light direction is described by a normalized vector with three real components. This constraint can be written as:

$$L_u^2+L_v^2 \leq 1 \quad (8)$$

However, this constraint need not apply when evaluating Equation (2) thereby allowing one to extrapolate the reflectance model beyond what is available from the source images or even what is geometrically achievable. This extrapolation does not have an exact physical analog, but it provides lighting that is more oblique than any used in the original source images. This provides for enhanced contrast for the object.

While the invention has been illustrated and described by means of specific embodiments, it is to be understood that numerous changes and modifications may be made therein without departing from the spirit and scope of the invention as defined in the appended claims and equivalents thereof.

What is claimed is:

1. A computer graphics system, comprising:
    a graphics processor;
    a memory accessible by said graphics processor, said memory comprising:
        a reflectance function model for each pixel of a digitized image of a surface, said reflectance function model being derived from a set of digital images of said surface obtained under various lighting conditions; and
        a routine, executable by said graphics processor, to implement a shape perception enhancing technique using said reflectance function model; and
    a display for displaying said enhanced surface.

2. The system as defined in claim 1, wherein the shape perception enhancing technique is specular enhancement.

3. The system as defined in claim 1, wherein the shape perception enhancing technique is diffuse gain.

4. The system as defined in claim 1, wherein the shape perception enhancing technique is light direction extrapolation.

5. The system as defined in claim 1, wherein the model includes a polynomial equation.

6. A method of enhancing shape perception in a computer graphics system, comprising the steps of:
    obtaining a set of digital images of an object under various lighting conditions;
    deriving a reflectance function model for each pixel based on said digital images;
    enhancing shape perception of said object using said reflectance function model; and
    rendering said enhanced object.

7. The method as defined in claim 6, wherein said enhancing comprises specular enhancement.

8. The method as defined in claim 6, wherein said enhancing comprises diffuse gain.

9. The method as defined in claim 6, wherein said enhancing comprises light direction extrapolation.

10. An apparatus for enhancing shape perception in a computer graphics system, comprising:
    means for obtaining a set of digital images of an object under various lighting conditions;
    means for deriving a reflectance function model for each pixel based on said digital images;
    means for enhancing shape perception of said object using said reflectance function model; and
    means for rendering said enhanced object.

11. The apparatus as defined in claim 10, wherein means for enhancing comprises means for specular enhancement.

12. The apparatus as defined in claim 10, wherein means for enhancing comprises means for diffuse gain.

13. The apparatus as defined in claim 10, wherein means for enhancing comprises means for light direction extrapolation.

14. An article of manufacture comprising computer-implemented processing instructions that, when executed, cause a processor to:
    load a model,
        said model being derived from a set of digital images of a surface obtained under varying lighting conditions;
        said model predicting reflectance of said surface,
        said reflectance being modeled as a function of an orientation of light incident on said surface;
    enhance shape perception of said surface by applying a perception enhancing technique to said model; and
    render said enhanced surface.

15. The article of manufacture of claim 14 where said model includes a polynomial texture map.

16. The article of manufacture of claim 14 where:
    said light orientation is represented by its components in a plane tangent to said surface; and
    said model includes curve fitting said reflectance as a function of said light orientation components.

17. The article of manufacture of claim 14 where said perception enhancing technique includes updating shading cues.

18. The article of manufacture of claim 14 where said perception enhancing technique includes adjusting specularity.

19. The article of manufacture of claim 14 where said perception enhancing technique includes adjusting directional light sensitivity by modifying said model.

20. The article of manufacture of claim 14 where said perception enhancing technique includes enhancing contrast via extrapolated oblique lighting effects.

21. The method of claim 6, wherein said enhancing includes:

transforming said reflectance function model.

22. The method of claim 21, wherein said transforming includes:

determining surface normals for surface points on said object; and performing specular enhancement based on said surface normals.

23. The method of claim 21, wherein said transforming includes:

determining surface normals for surface points on said object; and performing diffuse gain based on said surface normals.

24. The method of claim 9, wherein said light direction extrapolation includes:

evaluating reflectance function outside boundary conditions associated with physical conditions.

* * * * *